United States Patent
McCarten et al.

(10) Patent No.: US 8,813,103 B1
(45) Date of Patent: *Aug. 19, 2014

(54) METHODS AND SYSTEMS FOR HANDLING COMPONENT-OBJECT-MODEL COMMUNICATIONS

(71) Applicant: Symantec Corporation, Mountain View, CA (US)

(72) Inventors: Ryan McCarten, Redwood City, CA (US); Suneet Nandwani, San Jose, CA (US); Yury Mazin, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,967

(22) Filed: Jan. 7, 2013

Related U.S. Application Data

(63) Continuation of application No. 12/329,033, filed on Dec. 5, 2008, now Pat. No. 8,365,206.

(51) Int. Cl.
*G06F 9/54* (2006.01)

(52) U.S. Cl.
USPC ............... 719/330; 719/332; 726/1; 726/2; 726/26; 726/27; 718/1

(58) Field of Classification Search
None
See application file for complete search history.

(56) References Cited

U.S. PATENT DOCUMENTS

| | | | |
|---|---|---|---|
| 4,914,570 A * | 4/1990 | Peacock | 718/106 |
| 2001/0029552 A1 | 10/2001 | Foote et al. | |
| 2005/0058481 A1 * | 3/2005 | Christiansen et al. | 400/70 |
| 2005/0149726 A1 | 7/2005 | Joshi et al. | |
| 2007/0094667 A1 | 4/2007 | Bissett et al. | |
| 2007/0101435 A1 | 5/2007 | Konanka et al. | |

OTHER PUBLICATIONS

Microsoft Corporation; CoImpersonateClient Function; May 2, 2009; http://msdn.microsoft.com/en-us/library/ms690349(VS.85,printer).aspx.
Microsoft Corporation; RpcImpersonateClient Function; Apr. 2, 2009; http://msdn.microsoft.com/en-us/library/aa375720(VS.85,printer).aspx.
Microsoft Corporation; Microsoft SoftGrid Application Virtualization and Streaming; Apr. 23, 2007; www.microsoft.com/systemcenter/softgrid/evaluation/virtualization.mspx, as accessed Sep. 25, 2008.
Ruben Spruijt; Application virtualization and isolation solutions feature comparison matrix; PQR; Oct. 2007; Version 1.4; www.virtuall.nl/articles/ProductInformation/PQR%20-%20Application%20Virtualization_Isolation%20Feature%20Matrix.pdf, as accessed Sep. 25, 2008; De-Meern, Netherlands.
Mark Russinovich; Process Explorer v11.04; Nov. 5, 2007; Microsoft Corporation; www.technet.microsoft.com/en-us/sysinternals/bb896653.aspx.

* cited by examiner

*Primary Examiner* — H S Sough
*Assistant Examiner* — Umut Onat
(74) *Attorney, Agent, or Firm* — ALG Intellectual Property, LLC

(57) ABSTRACT

A computer-implemented method for handling component-object-model communications. The method may include identifying a request to instantiate a component-object-model object through a remote-procedure-call process. The component-object-model object may be associated with an out-of-process component-object-model server registered in a first environment. The remote-procedure-call process may be running in a second environment with a different registry than the first environment. The method may also include allowing the remote-procedure-call process to access the first environment. Corresponding systems and computer-readable media are also disclosed.

20 Claims, 7 Drawing Sheets

METHODS AND SYSTEMS FOR HANDLING COMPONENT-OBJECT-MODEL COMMUNICATIONS

CROSS REFERENCE TO RELATED APPLICATION

This application is a continuation of U.S. Pat. No. 8,365, 206, filed 5 Dec. 2008, the disclosure of which is incorporated by reference, in its entirety.

BACKGROUND

The Component Object Model (COM) standard is an interface standard that may be used to enable inter-process communications. The term COM may refer to various inter-process communication technologies, such as ActiveX, COM+, and DCOM. COM may implement objects that can be used in environments different from the environment they were created in. For example, DCOM is a technology that facilitates communication among software components distributed across networked computers.

COM technologies may also be implemented in virtual environments, but virtual environments may cause various problems for COM communications. When a process, such as a COM server, is virtualized, any registry changes it makes may not be visible to the underlying system. For example, a COM server may be registered in a virtual environment. A COM client in the virtual environment may attempt to instantiate a COM object through the COM server. As part of the attempt to instantiate the COM object, the client may identify a specific COM class and interface. A remote procedure call process, such as a Remote procedure call Subsystem (RpcSs) process, may look up the COM class. However, the RpcSs process may run at a system level, rather than in the virtual environment, and may not be able to see into the virtual environment where the COM server is registered. As a result, the RpcSs process may fail to instantiate the COM object.

As another example, a COM client may be running in a first virtual environment while a COM server may be running is a second, different virtual environment. The client may attempt to use a CoCreateInstance( ) call to instantiate a COM object associated with the COM server. However, CoCreateInstance( ) may return a "Class Not Registered" error because the remote procedure call process, which may be running at a system level, may not be able to see into the second virtual environment where the COM server is registered.

In a third example, a COM client may be running in a system environment while a COM server may be registered in a virtual environment. As with the other examples, the client may not be able to instantiate a COM object through the COM server because the COM server is registered in the virtual environment. Traditional virtualization technologies do not address these COM communication issues. What is needed, therefore, is the ability to better facilitate COM communications in virtual environments.

SUMMARY

Embodiments of the instant disclosure comprise methods and systems for handling component-object-model (COM) communications. In various embodiments, a COM virtualizer may allow a virtualized process to instantiate a COM object. For example, a COM virtualizer may intercept a COM object instantiation call made by a virtualized process and may temporarily bring a remote-procedure-call process (e.g., RpcSs) into the virtual environment of the virtualized process. After the COM object is instantiated, the remote-procedure-call process may be removed from the virtual environment to provide security by ensuring unavailability of the COM object to callers outside the virtual environment.

According to certain embodiments, a COM virtualizer may identify a request to instantiate a COM object through a remote-procedure-call process. Identifying the request to instantiate the COM object may comprise hooking the client process. In such embodiments, a COM virtualization Dynamic-Link Library (DLL) may hook the client process. In other embodiments, identifying the request to instantiate a COM object may comprise monitoring a registry hive associated with the COM communications. Monitoring the registry hive may be performed by a registry filter driver.

The COM object may be associated with an out-of-process COM server registered in a first environment (e.g., a virtual environment). The remote-procedure-call process may be running in a second environment with a different registry than the first environment (e.g., a system environment). The COM virtualizer may allow the remote-procedure-call process to access the first environment. For example, the COM virtualizer may allow the remote-procedure-call process to access the first environment by bringing a thread of the remote-procedure-call process into the first environment. The COM virtualizer may remove the thread of the remote-procedure-call process from the first environment after the COM object is instantiated.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
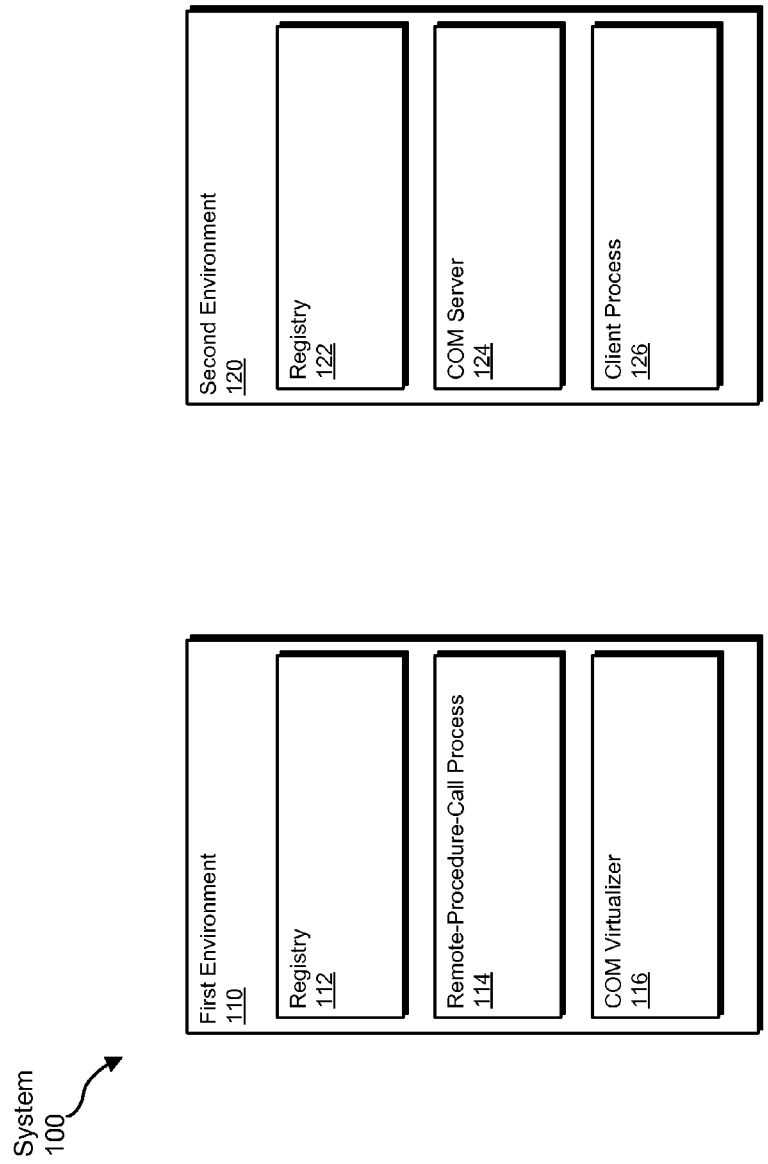
FIG. 1 is a block diagram of environments in which COM communications may be handled according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

As will be described in greater detail below, the instant disclosure generally relates to methods and systems for handling Component-Object-Model (COM) communications. COM may refer to various inter-process communication technologies, such as ActiveX, COM, COM+, and Distributed COM (DCOM). The following will provide, with reference to FIG. 1, a detailed description of a COM virtualizer for handling COM communications in a virtual environment. FIGS. 3 and 5 show similar COM virtualizers. Detailed descriptions of corresponding exemplary computer-implemented methods will be provided in connection with FIGS. 2 and 4. In addition, descriptions of an exemplary computing system and network architecture capable of implemented one or more of the embodiments described and/or illustrated herein will be provided in connection with FIGS. 6 and 7.

FIG. 1 is a block diagram of an exemplary system 100 with a first environment 110 and a second environment 120. First environment 110 may include a registry 112, a remote-procedure-call process 114, and a COM virtualizer 116. Second environment 120 may include a registry 122, a COM server 124, and a client process 126. Registries 112 and 122 may be databases of configuration settings in which COM servers may be registered. For example, registry 112 and/or registry 122 may be a WINDOWS registry.

Remote-procedure-call process 114 may be an RpcSs process. An RpcSs process may be a WINDOWS process that lets applications use declared RpcSs procedures. Remote-procedure-call process 114 may also be a DCOMLaunch service or any other service that allows a program to call another program's publicly available procedures.

First environment 110 may include a COM virtualizer 116. COM virtualizer 116 may be any computer-executable code programmed to perform one or more of the steps described herein. For example, COM virtualizer 116 may be a module, a plug-in, a software application, a DLL, or any other compilation of computer-executable code capable of implementing one or more steps of the instant disclosure.

COM virtualizer 116 may be programmed to facilitate the instantiation of a COM object from a virtualized process. In some embodiments, COM virtualizer 116 may be programmed to allow for instantiation of a COM object from a COM server in a virtual environment if the COM server is registered in the same virtual environment as the client process attempting to instantiate the COM object. In such embodiments, COM virtualizer 116 may guarantee that non-virtualized processes are not allowed to instantiate a virtualized COM object unless they already have access to the COM server's virtual environment. In other embodiments, COM virtualizer 116 may not guarantee that non-virtualized processes are not allowed to instantiate virtualized COM objects. According to various embodiments, COM virtualizer 116 may allow for instantiation of a COM object from a COM server in a virtual environment even if the COM server is registered in a different virtual environment than the client process (e.g., the client process may be running in a different virtual environment or in a system environment). COM virtualizer 116 may support calls to out-of-process COM servers. In some embodiments, COM virtualizer 116 may also support calls to out-of-process services.

In one example, first environment 110 may be a system environment (e.g., an operating system running on physical system hardware), and second environment 120 may be a virtual environment. In other embodiments, first environment 110 and second environment 120 may both be virtual environments. A virtual environment may be any platform that separates a process or application from the underlying system resources. For example, a virtual environment may be an application virtualization environment, such as ALTIRIS' Software Virtualization Solution. A virtual environment may also be implemented by any other virtualization technology. An application virtualization environment may use layers or packages for managing applications and data. Instead of modifying underlying system resources (e.g., a registry), an application in a layer may use resources associated with the layer. The layers may be activated, deactivated, and/or reset without altering a base operating system installation.

Continuing with the previous example, client process 126 may attempt to instantiate a COM object through COM server 124. Client process 126 may be any program (i.e., a COM client) configured to call COM methods. COM server 124 may be any program that makes COM objects available to a COM client. In some embodiments, COM server 124 may be an out-of-process COM server. An out-of-process COM server may run as a separate executable program in its own process space.

The attempt to instantiate the COM object may be a call to a COM interface. A call to a COM interface may be handled through an inter-process communication process, such as remote-procedure-call process 114. A call to a COM interface may be a request to access a specific COM interface, and the call may specify the COM class and interface required to instantiate the COM object. A COM interface may be a pointer to a group of functions that are called through COM. A COM class may be a definition of an object that implements one or more COM interfaces, and a COM object may be an instance of a COM class.

COM virtualizer 116 may identify the attempt to instantiate the COM object. COM virtualizer 116 may be able to identify the attempt to instantiate the COM object as a result of COM virtualizer 116 hooking client process 126. In some embodiments, COM virtualizer 116 may hook all non-system processes. System processes may include RpcSs, DCOMLaunch, NetSvcs, SpoolSv, Smss, Lsass, WinLogon, CsrSs, NetworkService, and various other processes. By hooking only non-system processes, COM virtualizer 116 may minimize the impact on the operating system of first environment 110. In some embodiments, COM virtualizer 116 may only hook COM calls from virtualized processes. In other embodiments, COM virtualizer 116 may hook all processes or any subset of processes. According to certain embodiments, COM virtualizer 116 may intercept every COM creation call made by every hooked process, and COM virtualizer 116 may run in every hooked process's address space.

After COM virtualizer 116 identifies the attempt to instantiate the COM object through COM server 124, COM virtualizer 116 may allow remote-procedure-call process 114 to access second environment 120 where COM server 124 is registered. In other words, COM virtualizer 116 may allow remote-procedure-call process 114 access to registry 122, where class information for the COM object may be stored. For example, COM virtualizer 116 may bring a thread of remote-procedure-call process 114 into second environment 120. Remote-procedure-call process 114 may then launch COM server 124, and a COM object may be instantiated. COM server 124 may create the requested COM object and create an interface to the COM object. After the COM object is instantiated, COM virtualizer 116 may remove the thread of remote-procedure-call process 114 from second environment 120.

Figure 2:
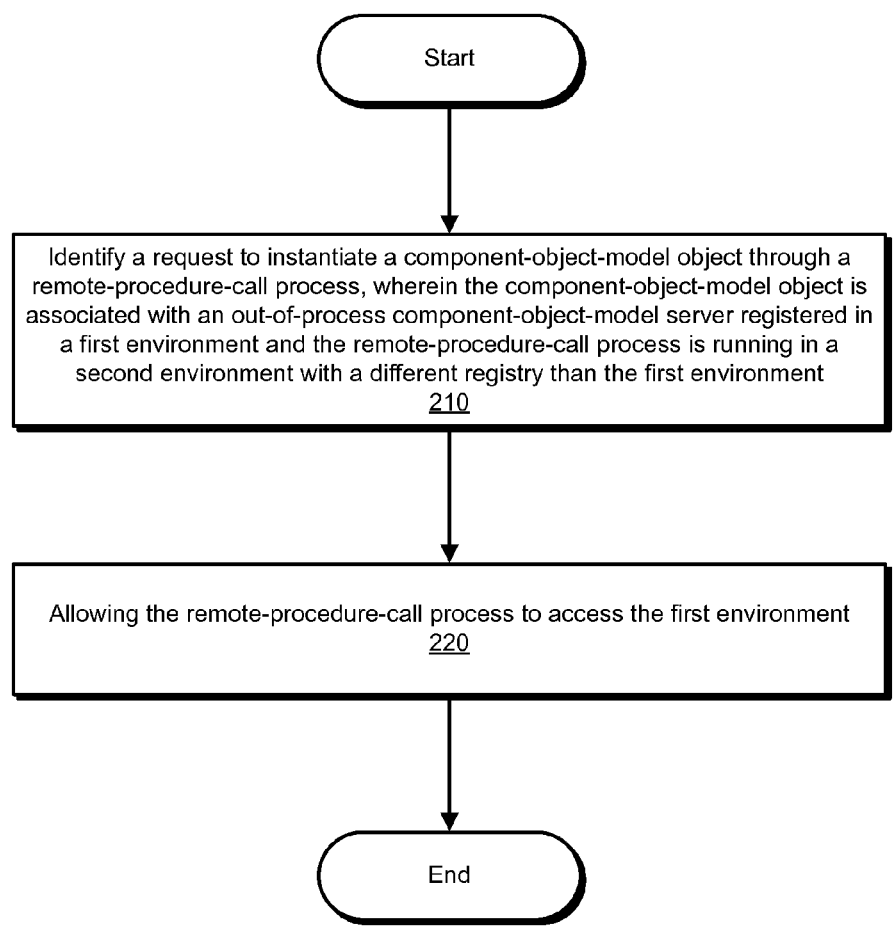
FIG. 2 is a flow diagram of a method for handling COM communications according to certain embodiments.
Figure 3:
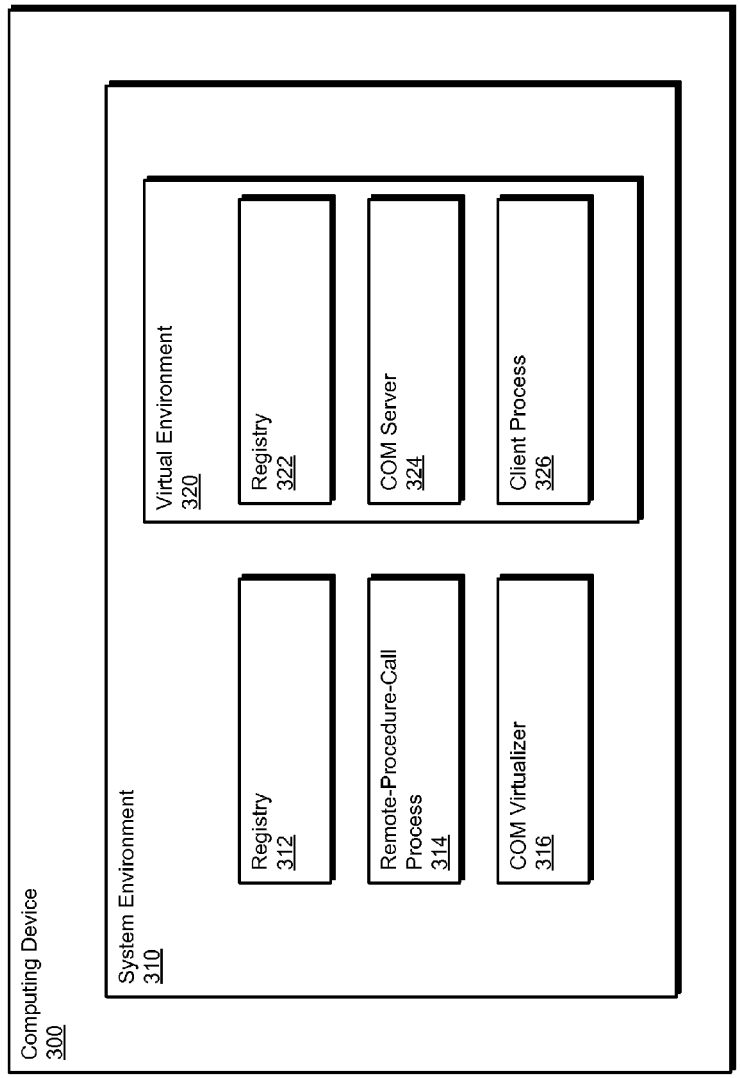
FIG. 3 is a block diagram of a computing device implementing a COM virtualizer according to certain embodiments.

FIG. 2 is a flow diagram that shows a method for processing and handling COM communications. A previously described, a COM virtualizer, such as COM virtualizer 116, may identify a request to instantiate a COM object through a remote-procedure-call process (step 210). The remote-procedure-call process may be an RpcSs process, a DCOMLaunch process, or any other suitable remote-procedure-call process.

The COM object may be associated with an out-of-process COM server registered in a first environment. The remote-procedure-call process may be running in a second environment with a different registry than the first environment. The first environment may be a virtual environment, and the second environment may be a system environment. The request to instantiate the COM object may be made by a client process running in the virtual environment. The client process may be an instance of any suitable computer program.

In some embodiments, the COM virtualizer may have hooked the client process, which may allow the COM virtualizer to identify the COM client's request to instantiate the COM object. For example, the COM virtualizer may be a DLL that hooks calls made by virtualized processes. In other embodiments, the COM virtualizer may identify a request to instantiate a COM object by monitoring a registry hive associated with COM communications. A registry hive may be any collection of one or more registry entries. For example, a registry hive may be a logical section of a registry. Monitoring the registry hive may be performed by a registry filter driver. In other words, the COM virtualizer may include, or be associated with, a registry filter driver.

Returning to FIG. 2, since the COM object is registered in the first environment, identification information (e.g., class and interface information) for the COM object may be located in a registry of the first environment, but the remote-procedure-call process may be running in a second environment. The second environment may have a registry that is independent of the first environment's registry. Thus, to facilitate instantiation of the COM object, the COM virtualizer may allow the remote-procedure-call process to access the first environment (step 220).

The COM virtualizer may allow the remote-procedure-call process to access the first environment by bringing a thread of the remote-procedure-call process into the first environment. Bringing a thread of the remote-procedure-call process into the first environment may comprise modifying a routing table to allow the remote-procedure-call process to access a registry of the first environment. Allowing the remote-procedure-call process to access the first environment may also comprise any other suitable algorithm for allowing the remote-procedure-call process to access the first environment to handle the request to instantiate the COM object.

After bringing the thread of the remote-procedure-call process into the first environment, the remote-procedure-call process may start the COM server, and the COM object may be instantiated. After the COM object is instantiated, the COM virtualizer may remove the thread of the remote-procedure-call process from the first environment. By removing the remote-procedure-call process from the first environment, the COM virtualizer may eliminate the possibility that an unauthorized application (i.e., an application not belonging to a virtual environment of the original caller or to the virtual environment of the COM server) will be able to use a virtualized COM server (i.e., a COM server registered in a virtual environment).

FIG. 3 is a block diagram of a computing device 300 with a system environment 310. System environment 310 may be a WINDOWS environment, such as WINDOWS XP, WINDOWS VISTA, WINDOWS SERVER, or any other WINDOWS operating system. System environment 310 may also be any other type of suitable operating system or other system environment. System environment 310 may include a registry 312, a remote-procedure-call process 314, and a COM virtualizer 316. System environment 310 may also include a virtual environment 320 running within system environment 310. Virtual environment 320 may include a registry 322, a COM server 324, and a client process 326.

In one example, system environment 310 may be a WINDOWS operating system, and registry 312 may be a registry of the WINDOWS operating system. Virtual environment 320 may be an application virtualization environment, and registry 322 may be stored in a layer that separates applications running in virtual environment 320 from resources of system 300. COM virtualizer 316 may hook calls from processes running in virtual environment 320. Thus, when client process 320 attempts to instantiate a COM object associated with COM server 324, COM virtualizer 316 may intercept the call. COM virtualizer 316 may then provide remote-procedure-call process 314 with access to virtual environment 320, and remote-procedure-call process 314 may be able to access COM server 324 and respond to the call from client process 326.

Figure 4:
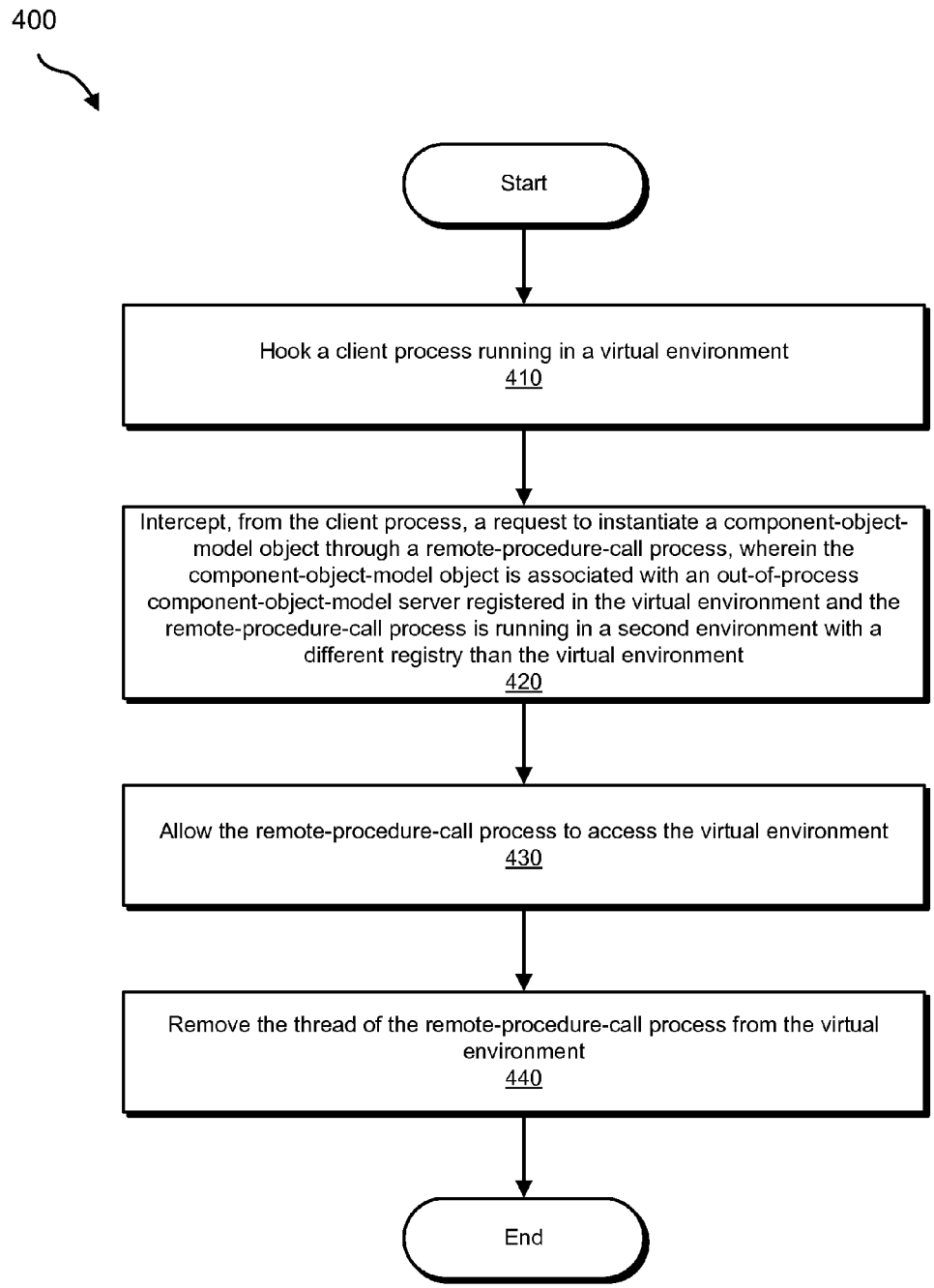
FIG. 4 is a flow diagram of an exemplary method for handling COM communications according to certain embodiments.
Figure 5:
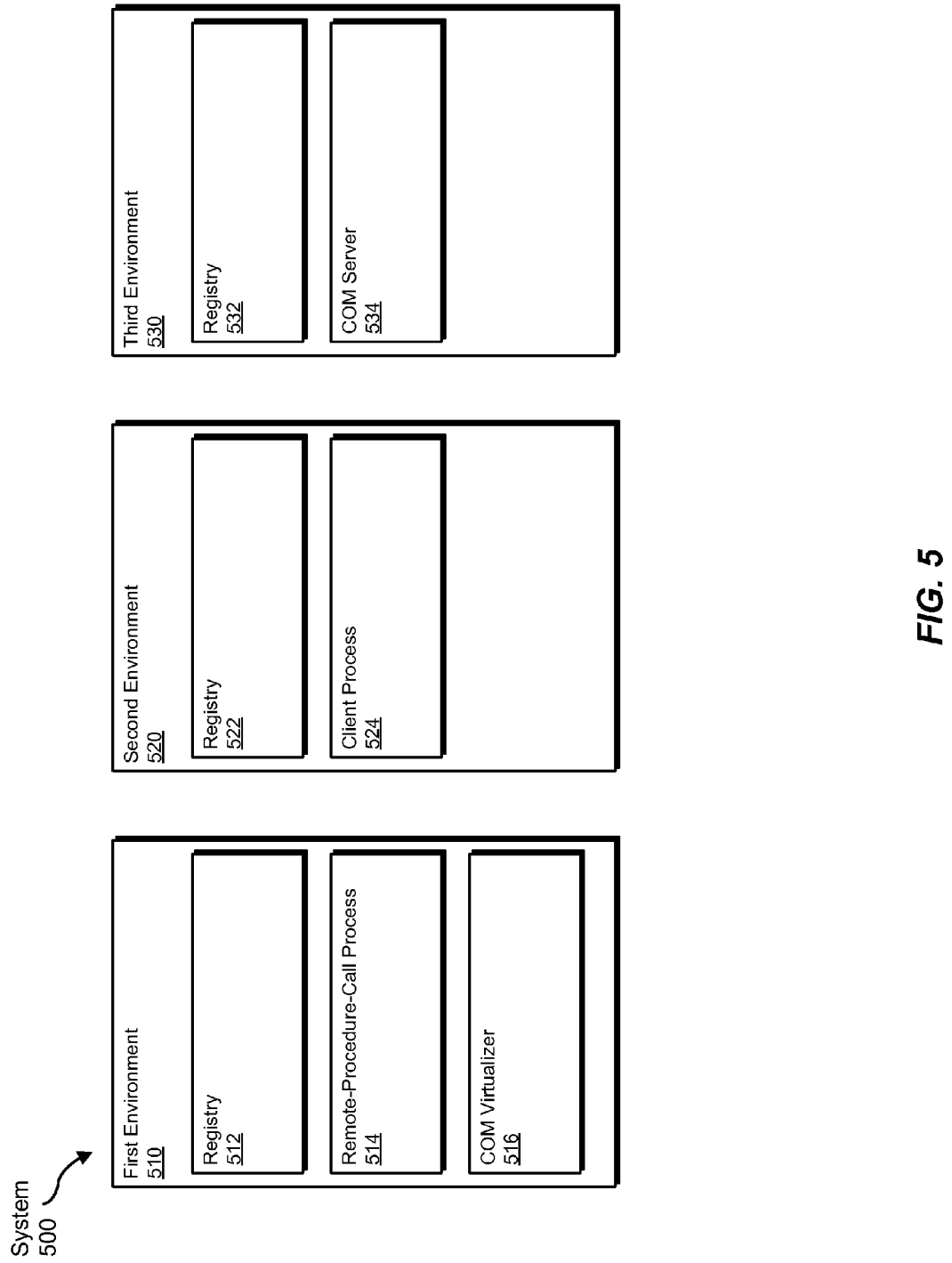
FIG. 5 is a block diagram of environments in which COM communications may be handled according to certain embodiments.

FIG. 4 shows a flow diagram of a process for using a COM virtualizer, such as COM virtualizer 316, to handle COM communications. The COM virtualizer may hook a client process (step 410). As previously mentioned, the COM virtualizer may hook all virtualized processes (i.e., processes running in a virtual environment), non-system processes, and/or any other set of processes. The COM virtualizer may then intercept a request from the client process to instantiate a COM object through a remote-procedure-call process 314 (step 420). A request to instantiate a COM object through a remote-procedure-call process may be a request that is handled by (i.e., a call executed by) the remote-procedure-call process. For example, the client process may make a CoCreateInstance( ) call, which may be handled by the remote-procedure-call process.

The COM object requested by the client process may be associated with an out-of-process COM server registered in the virtual environment, and the remote-procedure-call process may be running in a second environment with a different registry than the virtual environment. A COM object is associated with a COM server if the COM server is able to make the COM object available to the COM client. Since the remote-procedure-call process is running in an environment other than the virtual environment where the COM server is registered (i.e., where class and interface information for the COM object are stored in a registry), the remote-procedure-call process may not be able to instantiate the COM object with a COM virtualizer. The COM virtualizer may be able to enable to remote-procedure-call process to instantiate the COM object by allowing the remote-procedure-call process to access the virtual environment (step 430). After the COM object is instantiated, the COM virtualizer may remove the thread of the remote-procedure-call process from the virtual environment (step 440).

In some embodiments, a COM virtualizer may allow a client process in one environment to instantiate a COM object associated with a COM server in a different environment. For example, FIG. 5 shows a system 500 with a first environment 510, a second environment 520, and a third environment 530. First environment 510 may include a registry 512, a remoteprocedure-call process 514, and a COM virtualizer 516. Second environment 520 may include a registry 522 and a client process 524. Third environment 530 may include a registry 532 and a COM server 534. In some embodiments, first environment 510 may be a system environment, second environment 520 may be a first virtual environment, and third environment 530 may be a second virtual environment. In other embodiments, first environment 510 and second environment 520 may be part of the same environment. For example, first and second environments 510 and 520 may be a system environment, while third environment 530 may be a virtual environment.

Client process 524 may attempt to instantiate a COM object associated with COM server 534. COM virtualizer 516 may intercept the attempt to instantiate the COM object and may allow remote-procedure-call process 514 to access third environment 530. Thus, COM virtualizer 516 may enable client processes in any environment to access a COM server in a virtual environment.

Figure 6:
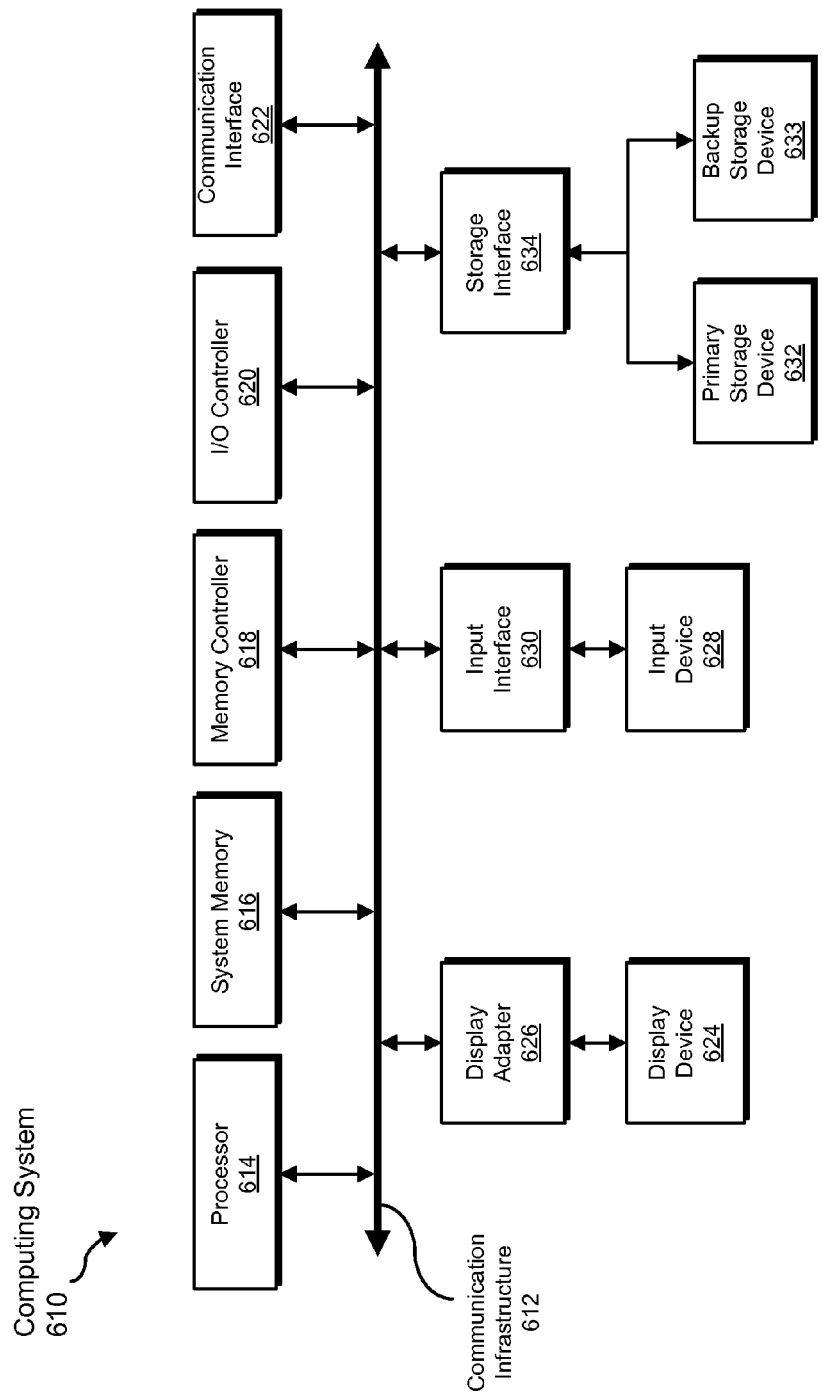
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, allowing, hooking, monitoring, bringing, modifying, removing, and/or intercepting steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, allowing, hooking, monitoring, bringing, modifying, removing, and/or intercepting identifying, allowing, hooking, monitoring, bringing, modifying, removing, and/or intercepting.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for identifying, allowing, hooking, monitoring, bringing, modifying, removing, and/or intercepting steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network or a wireless IEEE 802.11 network), a personal area network (such as a BLUETOOTH or IEEE Standard 602.15.1-2002 network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, allowing, hooking, monitoring, bringing, modifying, removing, and/or intercepting steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, allowing, hooking, monitoring, bringing, modifying, removing, and/or intercepting steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Storage devices 632 and 633 may also be used, for example, to perform and/or be a means for performing, either alone or in combination with other elements, one or more of the identifying, allowing, hooking, monitoring, bringing, modifying, removing, and/or intercepting steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
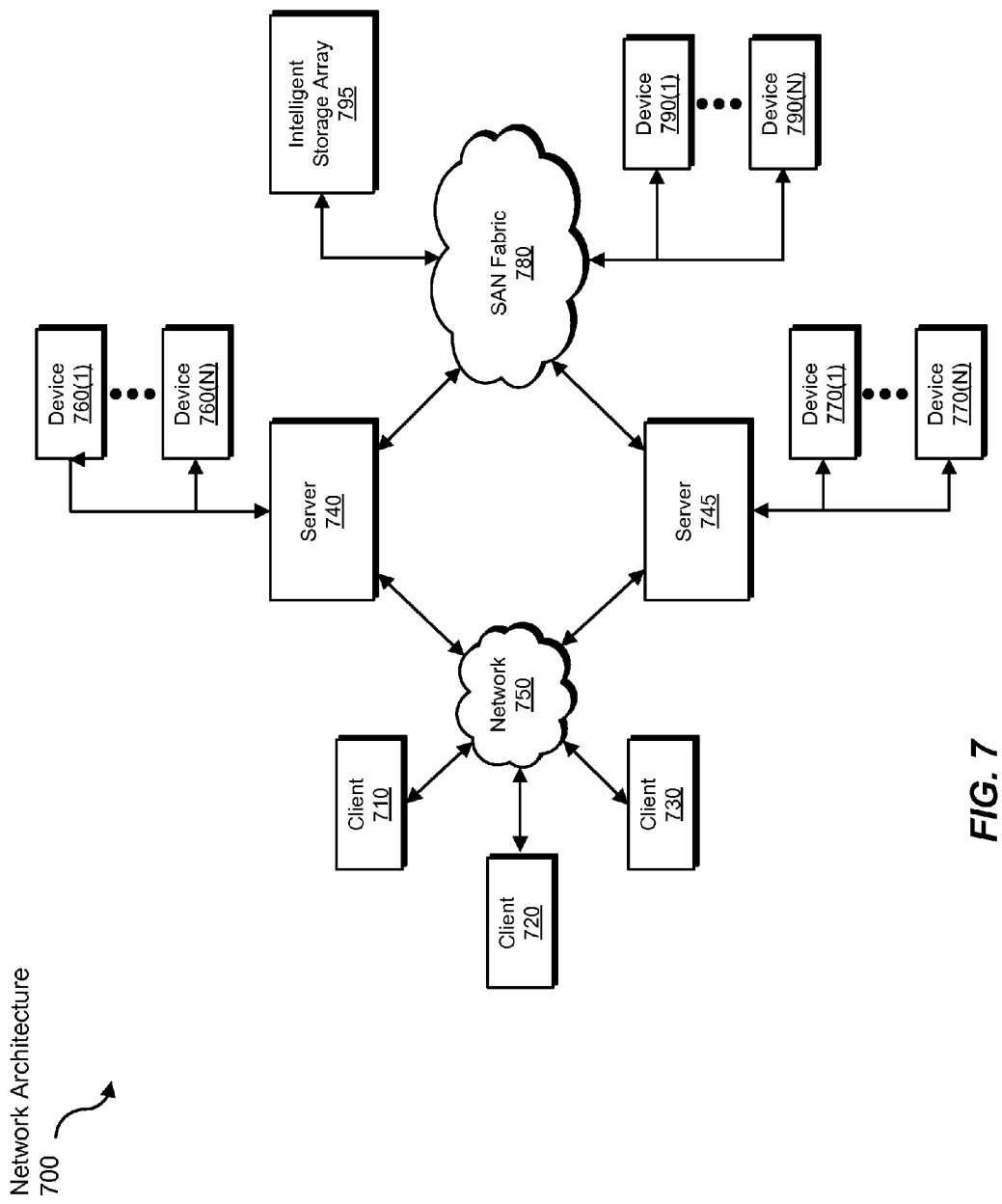
FIG. 7 is a block diagram of an exemplary computing system capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, allowing, hooking, monitoring, bringing, modifying, removing, and/or intercepting steps disclosed herein. Network architecture 700 may also be used to perform and/or be a means for performing other steps and features set forth in the instant disclosure.

As detailed above, computing system 610 and/or one or more of the components of network architecture 700 may perform and/or be a means for performing, either alone or in combination with other elements, one or more steps of the exemplary methods described and/or illustrated herein. For example, computing system 510 and/or one or more of the components of network architecture 500 may perform a computer-implemented method for handling Component-Object-Model (COM) communications. The method may comprise identifying a request to instantiate a component-object-model object through a remote-procedure-call process. The component-object-model object may be associated with an out-of-process component-object-model server registered in a first environment. The remote-procedure-call process may be running in a second environment with a different registry than the first environment. The method may also include allowing the remote-procedure-call process to access the first environment.

In some embodiments, the first environment may be a virtual environment. The request may be made by a client process running in the first environment. In certain embodiments, class information for the component-object-model object may be located in the registry of the virtual environment. In some embodiments, the remote-procedure-call process may be running in a system environment. In certain embodiments, identifying the request to instantiate the component-object-model object may comprise hooking the client process. In various embodiments, a Dynamic-Linked Library (DLL) may hook the client process. According to some embodiments, identifying the request to instantiate a component-object-model object may comprise monitoring a registry hive associated with component-object-model communications. In certain embodiments, monitoring the registry hive may be performed by a registry filter driver.

In some embodiments, the remote-procedure-call process may be at least one of an RpcSs process and/or a DCOM-Launch process. Allowing the remote-procedure-call process to access the first environment may comprise bringing a thread of the remote-procedure-call process into the first environment. Bringing the thread of the remote-procedure-call process into the first environment may comprise modifying a routing table to allow the remote-procedure-call process to access a registry of the first environment. The method may also include removing the thread of the remote-procedure-call process from the first environment.

A computer-implemented method for handling component-object-model communications may comprise hooking a client process running in a virtual environment. The method may also comprise intercepting, from the client process, a request to instantiate a component-object-model object through a remote-procedure-call process. The component-object-model object may be associated with an out-of-process component-object-model server registered in the virtual environment. The remote-procedure-call process may be running in a second environment with a different registry than the first environment. The method may further comprise allowing the remote-procedure-call process to access the virtual environment.

In some embodiments, the remote-procedure-call process may be running in a system environment. In certain embodiments, allowing the remote-procedure-call process to access the first environment may comprise bringing a thread of the remote-procedure-call process into the virtual environment. Bringing a thread of the remote-procedure-call process into the virtual environment may comprise modifying a routing table to allow the remote-procedure-call process to access a registry of the virtual environment. The method may also comprise removing the thread of the remote-procedure-call process from the first environment.

A computer-readable medium may comprise one or more computer-executable instructions that, when executed by a computing device, cause the computing device to identify a request to instantiate a component-object-model object through a remote-procedure-call process. The component-object-model object may be associated with an out-of-process component-object-model server registered in a first environment. The remote-procedure-call process may be running in a second environment with a different registry than the first environment. The computer-executable instructions may also cause the computing device to allow the remote-procedure-call process to access the first environment. In some embodiments, the first environment may be a virtual environment, and the request may be made by a client process running in a virtual environment. In various embodiments, identifying the request to instantiate the component-object-model object may comprise hooking the client process.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for handling component-object-model communications, the computer-implemented method comprising:
    identifying a request to instantiate a component-object-model object through a remote-procedure-call process, wherein:
        the component-object-model object is associated with an out-of-process component-object-model server registered in a first environment;
        the remote-procedure-call process is running in a second environment with a different registry than the first environment;
    allowing the remote-procedure-call process to access the first environment by bringing the remote-procedure-call process into the first environment;
    after the component-object-model object is instantiated, removing the remote-procedure-call process from the first environment.

2. The computer-implemented method of claim 1, wherein allowing the remote-procedure-call process to access the first environment comprises allowing the remote-procedure-call process to launch the out-of-process component-object-model server and instantiate the component-object-model object.

3. The computer-implemented method of claim 1, wherein class information for the component-object-model object is located in a registry of the first environment.

4. The computer-implemented method of claim 1, wherein the remote-procedure-call process is running in a system environment.

5. The computer-implemented method of claim 1, wherein identifying the request to instantiate the component-object-model object comprises hooking a client process, wherein the request to instantiate the component-object-model object is made by the client process.

6. The computer-implemented method of claim 5, wherein a dynamic-link library hooks the client process.

7. The computer-implemented method of claim 1, wherein identifying the request to instantiate the component-object-model object comprises monitoring a registry hive associated with component-object-model communications.

8. The computer-implemented method of claim 7, wherein monitoring the registry hive is performed by a registry filter driver.

9. The computer-implemented method of claim 1, wherein the remote-procedure-call process is at least one of:
    an RpcSs process;
    a DCOMLaunch process.

10. The computer-implemented method of claim 1, wherein allowing the remote-procedure-call process to access the first environment comprises bringing a thread of the remote-procedure-call process into the first environment.

11. The computer-implemented method of claim 10, wherein bringing the thread of the remote-procedure-call process into the first environment comprises modifying a routing table to allow the remote-procedure-call process to access a registry of the first environment.

12. The computer-implemented method of claim 10, wherein removing the remote-procedure-call process comprises removing the thread of the remote-procedure-call process from the first environment.

13. A computer-implemented method for handling component-object-model communications, the computer-implemented method comprising:
    hooking a client process running in a virtual environment;
    intercepting, from the client process, a request to instantiate a component-object-model object through a remote-procedure-call process, wherein:
        the component-object-model object is associated with an out-of-process component-object-model server registered in the virtual environment;
        the remote-procedure-call process is running in a second environment with a different registry than the virtual environment;
    allowing the remote-procedure-call process to access the virtual environment by bringing the remote-procedure-call process into the virtual environment;
    after the component-object-model object is instantiated, removing the remote-procedure-call process from the virtual environment.

14. The computer-implemented method of claim 13, wherein the second environment is a system environment.

15. The computer-implemented method of claim 13, wherein allowing the remote-procedure-call process to access the virtual environment comprises bringing a thread of the remote-procedure-call process into the virtual environment.

16. The computer-implemented method of claim 15, wherein bringing the thread of the remote-procedure-call process into the virtual environment comprises modifying a routing table to allow the remote-procedure-call process to access a registry of the virtual environment.

17. The computer-implemented method of claim 15, further comprising removing the thread of the remote-procedure-call process from the virtual environment.

18. A non-transitory computer-readable medium comprising one or more computer-executable instructions that, when executed by a computing device, cause the computing device to:
　identify a request to instantiate a component-object-model object through a remote-procedure-call process, wherein:
　　the component-object-model object is associated with an out-of-process component-object-model server registered in a first environment;
　　the remote-procedure-call process is running in a second environment with a different registry than the first environment;
　allow the remote-procedure-call process to access the first environment by bringing the remote-procedure-call process into the first environment;
　after the component-object-model object is instantiated, remove the remote-procedure-call process from the first environment.

19. The non-transitory computer-readable medium of claim 18, wherein:
　the first environment is a virtual environment;
　the request is made by a client process running in the virtual environment.

20. The non-transitory computer-readable medium of claim 19, wherein identifying the request to instantiate the component-object-model object comprises hooking the client process.

* * * * *